Figure 1:
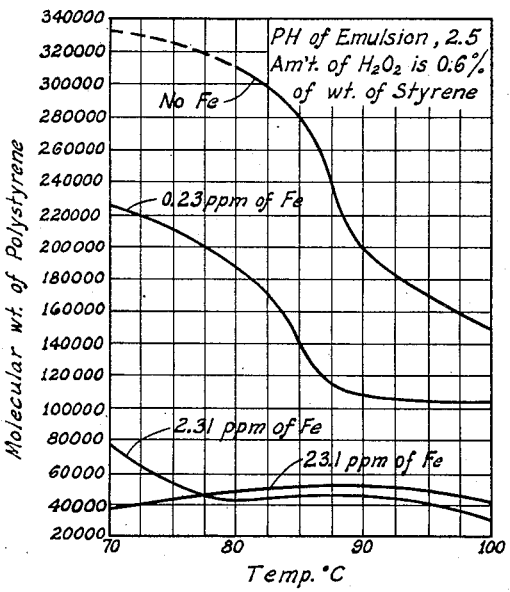

INVENTORS
Edgar C. Britton
Walter J. Le Fevre

ATTORNEYS

Patented Apr. 26, 1949

2,468,027

UNITED STATES PATENT OFFICE 2,468,027

EMULSION POLYMERIZATION IN THE PRESENCE OF AN IRON SALT AND A WATER-SOLUBLE PEROXIDE

Edgar C. Britton and Walter J. Le Fevre, Midland, Mich., assignors to The Dow Chemical Company, Midland, Mich., a corporation of Delaware Application July 16, 1943, Serial No. 494,922

20 Claims. (Cl. 260—86.5)

This invention concerns an improved method for the polymerization of monovinyl aromatic compounds and aliphatic conjugated diolefines and for the co-polymerization of such compounds in the presence or absence of other polymerizable unsaturated organic compounds, whereby the polymerization reaction may be carried out at a rapid rate to produce products having any of wide ranges of molecular weights and/or physical properties. The invention is particularly concerned with such method for producing polymeric products of lower molecular weight than are obtained by usual industrial polymerization methods.

It is well known that the physical properties of a polymeric product vary with change in the molecular weight and that a polymer of high molecular weight is preferred for some purposes and a corresponding polymer of lower molecular weight is preferred for others. For instance, solid polystyrene of molecular weight below 50,000 (according to the well known Staudinger method of determining molecular weights) is often brittle, but the polymer becomes tougher and less fragile with increase in the molecular weight. For molding purposes polystyrene of molecular weight above 50,000, e. g. from 70,000 to 200,000, is preferred. This is the usual quality of polystyrene on the market. On the other hand, polystyrene of lower molecular weight dissolves more readily and rapidly in many organic solvents and is preferred as an ingredient of varnishes and lacquers. Again, the usual rubber-like polymers and co-polymers of conjugated diolefines, e. g. the rubber-like co-polymers of butadiene and styrene, although useful as a substitute for natural rubber, are non-tacky and possess poor adhesive properties. However, the corresponding polymers and co-polymers of relatively low molecular weight are extremely tacky solids or viscous liquids which are adapted for use as, or in, adhesives. They also have the property of becoming resinous upon prolonged exposure, in unstabilized condition, to air. Accordingly, solutions of the same in solvents such as benzene, toluene, xylene, or ethylene chloride, etc., may be used as drying oils. They may also be incorporated with natural or synthetic rubbers and when so used often improve certain properties of the rubbers, e. g. they may render the rubbers tacky or increase the ease with which the rubbers may be compounded with lamp-black, sulphur and other usual rubber-compounding agents. The last mentioned use is illustrated in a co-pending application of R. R. Dreisbach et al., Serial No. 495,028, filed July 16, 1943, now issued as U. S. Patent 2,407,953.

The present industrial methods for polymerizing vinyl aromatic compounds and/or aliphatic conjugated diolefines are such as to produce the higher molecular weight polymers just mentioned. It is known that the molecular weight of polymeric products generally becomes lower with increase in the polymerization temperatures at which they are formed and low molecular weight polymeric products, such as those described above, have in some instances been prepared by carrying polymerizations out at unusually high temperatures, e. g. at temperatures of 200° C. or above. However, due to operating difficulties which are encountered at such high polymerizing temperatures, this method for producing the lower molecular weight polymers and co-polymers is not well-adapted to commercial practice.

The provision of a simple and convenient method for rapidly polymerizing vinyl aromatic compounds and/or conjugated diolefines to produce polymeric products having a desired average molecular weight, or a desired set of physical properties, should widen the fields of utility for the polymers. It is an object of this invention to provide such a method. A particular object is to provide such method whereby the lower molecular weight polymers and co-polymers discussed above may readily and economically be produced. Other objects will be apparent from the following description of the invention.

This application is a continuation-in-part of our co-pending applications, Serial No. 343,438, filed July 1, 1940, and issued Sept. 26, 1944 as U. S. Patent No. 2,359,196 and Serial No. 351,222, filed August 3, 1940, now abandoned. In said application, Serial No. 351,222, we have disclosed that the co-polymerization of polymerizable vinyl compounds may be carried out at unusually rapid rates in the presence of a complex catalyst comprising an acid, a peroxide and a ferric salt. In the application, Serial No. 343,438, we have shown that vinyl aromatic compounds may be polymerized rapidly and completely by carrying the polymerization out in an aqueous emulsion containing a peroxide and an acid in amount sufficient to acidify the emulsion.

We have now found that when polymerizing or co-polymerizing a monovinyl aromatic compound and/or an aliphatic conjugated diolefine in an acidic aqueous emulsion of pH value below 3 and containing a peroxide and an iron salt, the molecular weight of the polymer which is formed is largely dependent upon the proportion of iron (in said salt) relative to the unsaturated organic compound, or compounds, to be polymerized. By varying the proportion of the iron salt, relative to the polymerizable compound, or compounds, in the emulsion, the molecular weight of the polymer which is formed may be varied widely. It may be mentioned that the invention involves the employment of ionizable compounds of iron wherein the iron is attached directly to one or more acid radicals, e. g. it does not pertain to the employment of alcoholates or phenolates of iron as the active iron-containing component of the polymerization catalyst.

We have further found that such action of the iron salt in influencing the molecular weight of the polymeric product is obtained, to an appreciable extent, only when the emulsion is at a pH value below 3. At higher pH values the molecular weight of the polymer which is formed does not differ greatly from that of the polymer formed in the absence of the iron salt under otherwise similar conditions. In practice, the pH value of the emulsion is usually maintained within the narrow range of from 1.5 to 2.8, and preferably from 2 to 2.6, since it becomes increasingly difficult to maintain a stable emulsion as the pH value is lowered below 2 and the effectiveness of the iron salt in controlling the molecular weight of the polymeric product decreases sharply as the pH value is increased from 2.6 to 3.0.

We have also found that the iron salt is highly effective in controlling the molecular weight of the polymer which is formed only as long as undecomposed peroxide is present in the emulsion. A peroxide usually undergoes decomposition during the polymerization, and when the peroxide is substantially destroyed prior to completion of the polymerization reaction, the polymer thereafter formed in the presence of an iron salt does not differ greatly from that formed in the absence of the iron salt under otherwise similar conditions.

Another peculiarity which we have discovered is that, although the initial presence of a peroxide in the iron salt-containing acidic aqueous emulsion of a vinyl aromatic compound and/or an aliphatic conjugated diolefine greatly accelerates the rate of polymerization, once the polymerization reaction is well started, destruction of the peroxide, e. g. by decomposition, does not result in an appreciable decrease in the rate of polymerization. It is, however, necessary that a peroxide be present until the polymerization is well started, since otherwise the reaction may cease, or be retarded, upon disappearance of the peroxide.

Accordingly, by proper proportioning of the catalyst ingredients, particularly the iron salt and the peroxide, the polymerization may be caused to occur rapidly with formation of a polymeric product having a desired average molecular weight or set of physical properties. The effect of the iron salt, in the presence of a peroxide and at a pH value below 3, is to cause the formation of a polymer of lower molecular weight than is formed in its absence under otherwise similar conditions. The amount by which the molecular weight is lowered due to the influence of the iron salt is largely dependent upon the proportion of the latter relative to the polymerizable compound or compounds. In general, the molecular weight of the polymer becomes lower with increase in the proportion of iron (in salt form) present during its formation. However, the rate of decomposition of the peroxide increases with increase in the proportion of the iron salt. In a series of experiments, all carried out using the same proportion of a peroxide and at the same pH value, but employing different proportions of an iron salt, the molecular weight of a polymer product decreases in a regular manner with increase in the proportion of iron until a point is reached at which the peroxide is largely decomposed before completion of the polymerization reaction. A further increase in the amount of iron (without increasing the proportion of peroxide in the emulsion) results in a fairly regular increase in the molecular weight of the polymer which is formed. These results indicate that after disappearance of the peroxide, the iron salt is relatively ineffectual in depressing the molecular weight of the polymer which is being formed. The average molecular weight of the polymeric product is thereby increased. Such tendency for the molecular weight of the polymer to become higher with an increase in the proportion of the iron salt may be overcome by increasing the proportion of peroxide in the emulsion, or by adding a peroxide during the polymerization reaction.

From the facts and principles just set forth it will be seen that by initially employing sufficient peroxide so that the latter is present throughout the polymerization reaction, the molecular weight of the polymer which is formed may be varied in accordance with the proportion of an iron salt used, i. e. by employing a very minute amount of such salt a polymer of high molecular weight may be produced, or by using a larger proportion of the salt a polymer of low molecular weight may be obtained. However, by employing a peroxide in amount such that it is substantially or completely decomposed before completion of the polymerization reaction, a mixture of a polymer of low molecular weight and the corresponding polymer of higher molecular weight may be produced. In such instance, the molecular weight of the lower polymer is largely dependent upon the proportion of iron salt (relative to the polymerizable compound) in the mixture. Such mixtures of a low molecular weight polymer and a corresponding high molecular weight polymer usually differ in properties from either such polymer alone and often are desired.

It should be mentioned that certain variable factors, other than the pH value of the emulsion, the presence of a peroxide and the proportion of an iron salt in the emulsion, may also influence the molecular weight of the polymer product. For instance, the molecular weight of the polymer varies somewhat with change in the temperature at which it is formed. However, within the range of temperatures which are satisfactory for carrying out the emulsion polymerization reactions, the influence of a change in temperature on the molecular weight of the polymer is small compared to that which may be effected by changing the proportion of iron salt in the emulsion. Peculiarly, the influence of a change in the reaction temperature on the molecular weight of the polymer product becomes less with increase in the proportion of iron in the emulsion. An increase in the proportion of a peroxide in the emulsion usually results in a decrease in the molecular weight of the polymer which is formed, but this effect also is small compared to that of an equal change, on a weight basis, in the proportion of iron (as an iron salt) in the emulsion. The kind and proportion of emulsifying agent may also influence the molecular weight of the polymer which is formed and different emulsifying agents differ widely in this respect, i. e. a change in the proportion of certain emulsifying agents has little or no effect on the molecular weight of the polymer which is formed, but a change in the proportion of other emulsifying agents may have a pronounced effect. However, regardless of the identity of the emulsifying agent employed, the foregoing effects of the iron salt in conjunction with the peroxide and an acid, are obtained.

The accompanying drawing is a series of graphs illustrating the foregoing relationships between the polymerization temperature, the acidity of an aqueous emulsion of a vinyl aromatic compound and the concentrations of an iron salt and a peroxide in the emulsion in influencing the molecular weight of the polymer formed by polymerizing the vinyl aromatic compound while in the emulsion. Each figure of the drawing indicates the reaction conditions which were varied in carrying out the experiments upon which the curves therein were based. It also indicates the values of certain other conditions which, though capable of being varied, were maintained constant in carrying out said experiments. Although the experiments upon which the curves are based were carried out as carefully as possible, it will be understood that in view of the many variable conditions involved the curves may in some instances be slightly inaccurate. However, they are sufficiently accurate to illustrate the influences of the above mentioned variable conditions.

The procedure in carrying out the experiments upon which the curves in the drawing are based is described in the examples hereinafter presented. It may be mentioned that in the drawing the proportion of pure hydrogen peroxide, i. e. $H_2O_2$, is expressed as per cent of the weight of the styrene and that the proportion of iron salt employed is expressed in terms of the parts by weight of iron in the salt per million parts of the styrene.

Fig. 1 of the drawing shows the influence of a change in the polymerization temperature on the molecular weight of the polystyrene product, both with iron present and with it absent during the polymerization reaction. The dotted portion of the upper curve is not based on experimentation, but is an extension of the solid portion of the curve. It will be noted that in the absence of an iron salt, the molecular weight of the polymer changes considerably with change in the polymerization temperature, but that the change in molecular weight with change in temperature becomes less with increase in the proportion of an iron salt in the emulsion. It will also be noted that at any given polymerization temperature, the presence of an iron salt results in a lowering of the molecular weight of the polymer which is formed. As hereinbefore mentioned, this effect of the iron salt is obtained only when a peroxide is present in the emulsion.

Figure 2:
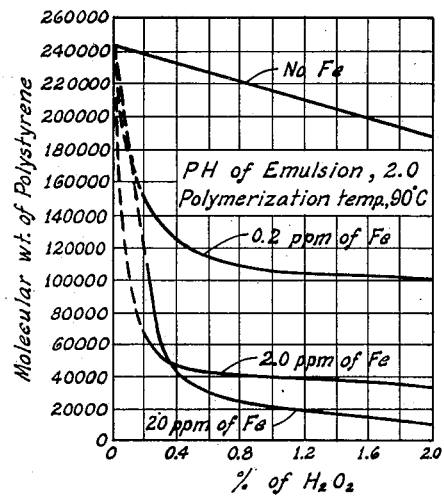

Fig. 2 of the drawing shows the effect, both in the presence and in the absence of an iron salt, of a change in the initial peroxide content of an emulsion on the molecular weight of polystyrene formed in the emulsion. In the absence of an iron salt, the molecular weight of the polymer decreases, though not greatly, with increase in the peroxide content of an emulsion. The figure shows that this same effect of the peroxide is obtained when an iron salt is present, but that the introduction of an iron salt into the emulsion causes a great reduction in the molecular weight of the polymer which is formed. The dotted portions of the curves are not based on experimental data, but are projections of the solid portions of the curves which are based on experimental data.

Figure 3:
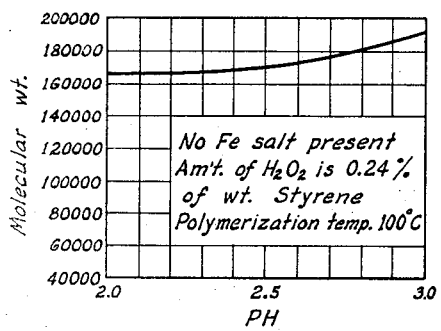
Figure 4:
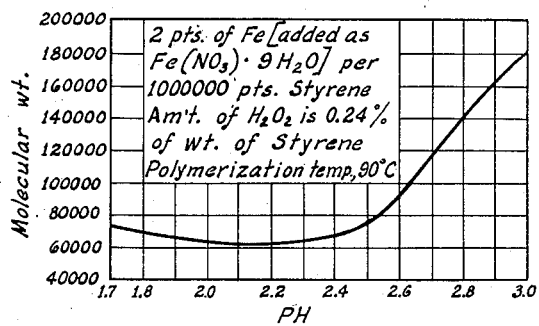

The curves shown in Figs. 3 and 4 of the drawing are presented for purpose of comparison. Fig. 3 shows the effect of a change in the pH value of an emulsion on the molecular weight of the polymer when carrying the polymerization out in the absence of iron salts at a temperature of 100° C. Fig. 4 shows the influence of a change in the pH value of the emulsion on the molecular weight of the polymer when carrying the polymerization out in the presence of an iron salt at 90° C. It will be seen that the polystyrene formed in the presence of an iron salt was of lower molecular weight than that formed in the absence of such salt, but that the action of the salt in lowering the molecular weight of the polymer was less at a pH of 3 than at lower pH values. Fig. 1 indicates that the difference in the polymerizing temperatures employed in determining the values shown in the respective Figures, 3 and 4, is not such as to alter appreciably the molecular weights of the products. In Fig. 4, it will be noted that the molecular weights increase toward the extremities of the curve. The increase in the molecular weight values toward the left on the curve is thought to have been due to imperfect emulsification. The increase in the molecular weight values toward the right end of the curve is due to a decrease in the action of the iron salt in lowering the molecular weight of the product. As hereinbefore mentioned, at pH values above 3, iron salts have little, if any, influence on the molecular weight of the polymer being formed. However, even at such higher pH values they may influence the rate of the polymerization reaction.

Figure 5:
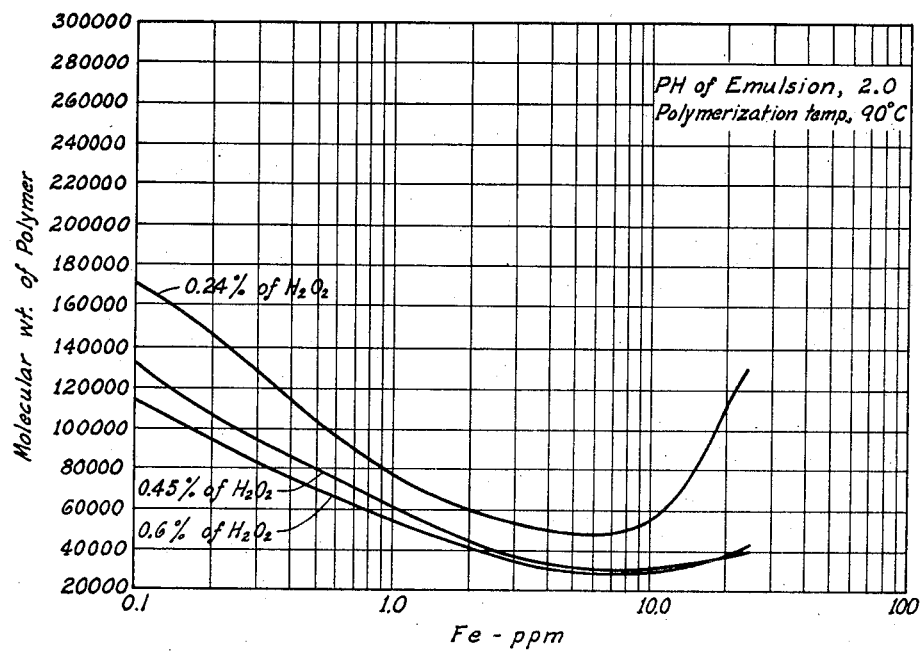

Fig. 5 is a series of curves, each of which shows the effect of increasing proportions of an iron salt on the molecular weight of the polystyrene product. The curves differ from one another as regards the proportion of peroxide present during the polymerization reactions; hence the several curves also illustrate the influence of a change in the peroxide concentration on the molecular weight of the polystyrene product. The increasing molecular weight values toward the right on the curves are thought to be due to the peroxide having been largely decomposed prior to completion of the polymerization reaction. As hereinbefore mentioned, the action of the iron salt in greatly depressing the molecular weight of a polymer which is being formed is obtained only while a peroxide is also present in the polymerization mixture. Accordingly, as the mixture becomes depleted of the peroxide, e. g. due to decomposition of the latter, there may be a sharp increase in the molecular weight of the polymer being formed with a resultant more gradual increase in the average molecular weight of the polymer product as a whole.

Figure 6:
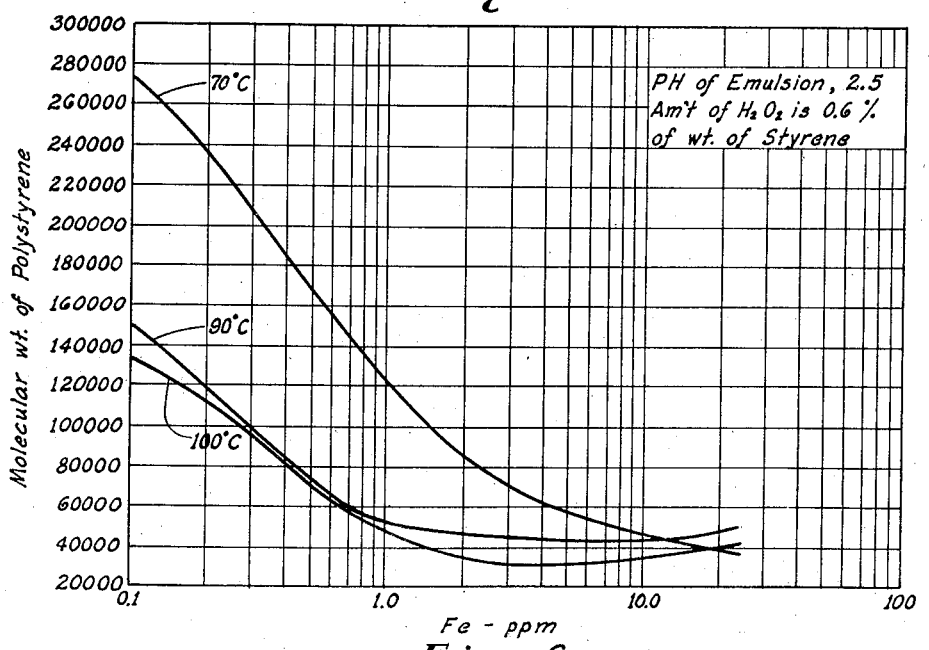

Fig. 6 is a series of curves showing the influence of increasing proportions of an iron salt on the molecular weight of the polystryene product. The curves differ from one another as to the polymerizing temperature. Accordingly, the set of curves also brings out the effect of changes in the polymerization temperature on the molecular weight of the polystyrene product.

In each of Figs. 5 and 6, the horizontal axis of the graph is graduated on a logarithmic scale in order that a wide range of values may be shown.

The above-described influences of changes in the polymerization temperature, the acidity of an emulsion and the concentrations of an iron salt and a peroxide are also obtained when polymerizing in aqueous emulsion other monovinyl aromatic compounds, e. g. para-chloro-styrene, ortho-chloro-styrene, ortho-ethyl-styrene, meta-ethyl-styrene, or para-isopropyl styrene, etc.; or aliphatic conjugated diolefines such as butadiene-1.3, isoprene, or 2.3-dimethyl-butadiene-1.3, etc.; or a mixture of a vinyl aromatic compound and a conjugated diolefine which mixture may, if desired, contain other polymerizable unsaturated organic compounds such as methyl vinyl ketone, methyl isopropenyl ketone, or vinyl acetate, etc. However, because of the difficulty of accurately determining the molecular weights of the rubber-like polymers and co-polymers of the diolefines, the results of changes in said polymerization conditions are, in examples hereinafter presented, expressed in terms of the physical properties of the polymeric products instead of in terms of their molecular weights.

In order that the experiments, on which the curves in each figure of the drawing are based, might be truly comparative, the styrene was in all instances employed in the same concentration, hydrogen peroxide was employed as the peroxide ingredient of the catalyst; ferric nitrate was in all instances added as the iron-containing ingredient; nitric acid was used to give the mixtures the desired pH value, and Nopco (a sodium salt of sulphonated sperm oil) was used as the emulsifying agent. However, these particular agents and conditions are illustrative and not limiting.

For instance, the styrene, or other polymerizable compound or compounds, may be employed in any desired concentration in the emulsion. Our research indicates that the concentration of styrene, relative to the water, in an aqueous emulsion has little or no effect upon the molecular weight of the polystyrene obtained upon polymerizing the emulsified styrene. Also, in place of hydrogen peroxide, any other water-soluble peroxide, e. g. sodium peroxide, barium peroxide, peracetic acid, ammonium persulphate, sodium persulphate, or potassium persulphate, may be used. The identity of the iron salt is of little consequence, provided it is one which is soluble or emulsifiable to yield positive iron ions. Examples of iron salt which may be used are ferric nitrate, ferric sulphate, ferric chloride, ferrous sulphate, ferrous chloride, ferric acetate, etc. In general an iron salt of an inorganic acid is preferred, since such salt is least likely to contaminate the polymer product, but as just indicated iron salts of organic carboxylic acids may in some instances be used. Any acid capable of bringing the emulsion to the desired pH value may be employed. Examples of suitable acids are nitric acid, hydrochloric acid, sulphuric acid, acetic acid, and propionic acid, etc. In place of the Nopco, other usual emulsifying agents, e. g. egg albumen, or the alkali metal sulphonates of aliphatic hydrocarbons or alkyl-aromatic hydrocarbons of high molecular weight, may be used. Nopco is preferred, since a change in the proportion of the same has little effect on the molecular weight of the polymer product.

As will be seen from the accompanying drawing, the presence of a mere trace of an iron salt together with a peroxide is sufficient to influence a polymerization in an acidic aqueous emulsion in such way as to markedly reduce the molecular weight of the polymer being formed. The iron salt may be employed in as large a proportion as desired, provided that a peroxide is present therewith in the emulsion. In practice the iron salt is usually employed in amount corresponding to at least 0.01 part, e. g. between 0.1 and 500 parts, by weight of iron (Fe) per million parts of the organic compound or compounds to be polymerized. In producing the low molecular weight polymers and co-polymers of conjugated diolefines we preferably employ between 1 and 200 parts of iron, as an iron salt, per million parts of the polymerizable compound or compounds. In producing a low molecular weight polymer of a vinyl aromatic compound, e. g. styrene, we usually employ between 1 and 100 parts, and preferably between 10 and 100 parts, of iron per million parts of the vinyl aromatic compound. The proportion of peroxide may be varied widely, the optimum proportion being dependent upon the other variable conditions used, e. g. the proportion of iron salt employed, the polymerization temperature and whether or not the action of the iron salt in depressing the molecular weight of the polymer being formed is desired throughout the reaction period. In general, when the action of the iron salt in depressing the molecular weight of the polymer is desired throughout the polymerization reaction, an increase in the proportion of an iron salt may necessitate an increase in the proportion of peroxide. The latter may, of course, be used in large excess if desired. Again, when the action of the iron salt in depressing the molecular weight of the polymer is desired during only a portion of the reaction period, the peroxide may be used in amount such that it is decomposed prior to completion of the polymerization reaction. The rate of decomposition of the peroxide is dependent both on the proportion of iron salt present and on the polymerization temperature; hence, exact limits as to the proportions of the iron salt and the peroxide cannot be stated. However, in producing a mixture of low molecular weight and high molecular weight polymers of styrene, the styrene may be polymerized while in an acidic emulsion which contains between 10 and 100 parts by weight of iron (as an iron salt) per million parts of the styrene and hydrogen peroxide in amount corresponding to between 0.1 and 1 per cent of the weight of the styrene. By increasing the relative proportion of the peroxide, polystyrene of low molecular weight, e. g. below 50,000, may be obtained. An acid is used in amount sufficient to give the emulsion a pH value below 3.

The polymerization reaction is usually carried out by heating the emulsion at temperatures between 50° and 150° C., the optimum temperature being dependent upon the compounds being polymerized. In polymerizing or co-polymerizing diolefines, temperatures between 50° and 125° C., preferably between 60° and 100° C., are usually employed. In polymerizing monovinyl aromatic compounds similar temperatures may be used, but temperatures between 70° and 100° C. are preferred. The reaction occurs rapidly and usually is complete in less than 10 hours. In some instances the reaction may be completed in less than 0.5 hour. After completing the reaction the polymer product is coagulated and precipitated in any of the usual ways, e. g. by freezing, or by adding coagulating agents such as alcohol, ammonia, sodium chloride, or calcium chloride, etc. An antioxidant may sometimes advantageously be added to the emulsion prior to coagulating the product. The product is filtered or otherwise separated from the liquor, washed free of adhering mother liquor and dried.

The following examples illustrate certain ways in which the invention has been practiced, but are not to be construed as limiting its scope.

EXAMPLE 1

The purpose of this example is to present data indicating the effect of changes in the polymerization temperature on the molecular weight of polystyrene prepared by polymerizing styrene in aqueous emulsion. Four different series of experiments were carried out. In each experiment 50 parts by weight of styrene was added to 125 parts of an aqueous solution containing 1 part of Nopco (a sodium salt of sulphonated sperm oil), 0.3 part of hydrogen peroxide ($H_2O_2$), ferric nitrate in the proportion indicated in the following table, and sufficient nitric acid to give the entire mixture a pH value of 2.5. Each emulsion was heated at the temperature, also given, until the styrene was polymerized. The polystyrene was precipitated by adding to each emulsion 3 volumes of ethyl alcohol and boiling the mixture. The polystyrene was separated by filtration, washed with alcohol and dried. Its molecular weight was then determined by the well-known Staudinger method. The several series of experiments differed in that in the first series no iron salt was present during polymerization; in the second series ferric nitrate was present in amount corresponding to 0.23 part by weight of iron per million parts of the styrene; in the third series the emulsions contained iron nitrate in amount coresponding to 2.31 parts of iron per million parts of the styrene; and in the fourth series of experiments the emulsions contained 23.1 parts of iron per million parts of styrene. The following data collected in these several series of experiments, was used in drawing the curves shown in Fig. 1 of the drawing.

Table I

| Run No. | Fe, P. P. M. | Temperature, °C. | Mole Weight of Polystyrene |
|---|---|---|---|
| 1 | None | 80 | 310,000 |
| 2 | None | 85 | 280,000 |
| 3 | None | 90 | 200,000 |
| 4 | None | 100 | 150,000 |
| 5 | 0.23 | 70 | 225,000 |
| 6 | 0.23 | 80 | 192,000 |
| 7 | 0.23 | 90 | 108,000 |
| 8 | 0.23 | 100 | 105,000 |
| 9 | 2.31 | 70 | 78,000 |
| 10 | 2.31 | 80 | 42,000 |
| 11 | 2.31 | 90 | 45,000 |
| 12 | 2.31 | 100 | 32,000 |
| 13 | 23.1 | 70 | 38,000 |
| 14 | 23.1 | 80 | 48,000 |
| 15 | 23.1 | 90 | 51,000 |
| 16 | 23.1 | 100 | 42,000 |

EXAMPLE 2

Several series of experiments were carried out for the purpose of determining the effect of varying the proportion of peroxide present during the emulsion polymerization of styrene both in the absence of iron salts and in the presence of several different proportions of ferric nitrate. The procedure in carrying out the experiments was similar to that described in Example 1, except as follows: the emulsions were each initially of a pH value of 2; all polymerizations were carried out at 90° C.; the proportions of hydrogen peroxide employed in the different experiments were varied as indicated in the following table; and the proportions of ferric nitrate in the emulsions were varied as also indicated. After completing each polymerization reaction, the polystyrene product was separated and its average molecular weight was determined. Table II states the proportion of hydrogen peroxide used in each experiment as per cent of the weight of the styrene and the proportion of ferric nitrate as parts by weight of iron (in the ferric nitrate) per million parts of styrene. It also gives the molecular weight of the polystyrene product. The data collected was employed in drawing the curves shown in Fig. 2 of the drawing.

Table II

| Run No. | Fe, P. P. M. | $H_2O_2$, Percent | Mole Weight of Polystyrene |
|---|---|---|---|
| 1 | None | 0.24 | 234,000 |
| 2 | None | 0.35 | 228,000 |
| 3 | None | 0.35 | 234,000 |
| 4 | None | 1.02 | 217,000 |
| 5 | None | 1.5 | 205,000 |
| 6 | None | 2.04 | 187,000 |
| 7 | 0.2 | 0.24 | 145,000 |
| 8 | 0.2 | 0.6 | 115,000 |
| 9 | 0.2 | 1.0 | 106,000 |
| 10 | 0.2 | 2.0 | 101,000 |
| 11 | 2.0 | 0.18 | 78,000 |
| 12 | 2.0 | 0.24 | 60,000 |
| 13 | 2.0 | 0.45 | 43,000 |
| 14 | 2.0 | 1.02 | 38,000 |
| 15 | 2.0 | 2.0 | 35,000 |
| 16 | 20.0 | 0.24 | 103,000 |
| 17 | 20.0 | 0.45 | 38,000 |
| 18 | 20.0 | 1.5 | 17,000 |
| 19 | 20.0 | 2.0 | 12,000 |

EXAMPLE 3

The purpose of this example is to illustrate the effect of changes in the pH values of emulsions on the molecular weight of polystyrene formed in the emulsions. Two series of experiments were carried out in accordance with the procedure described in Example 1, except as follows. In all of the experiments, the emulsions contained 0.24 per cent of hydrogen peroxide, based on the weight of the styrene. The first series of experiments were carried out using a polymerization temperature of 100° C., and employing emulsions which were free of iron salts. The pH values of the emulsions were varied from one experiment to the next and the molecular weight of the polystyrene obtained in each experiment was determined. The data collected in this series of experiments was employed in drawing the curve shown in Fig. 3 of the drawing. In the second series of experiments the emulsions employed each contained ferric nitrate in amount corresponding to 2 parts by weight of iron per million parts of styrene; a polymerization temperature of 90° C. was employed; the pH values of the emulsions were varied from one experiment to the next; and the molecular weight of the polystyrene obtained in each experiment was determined. The data collected in this series of experiments was used in drawing the curve of Fig. 4 of the drawing. The following table gives the pH value of the emulsion used in each experiment, states whether or not ferric nitrate was present in the emulsion and gives the average molecular weight of the polystyrene obtained.

Table III

| Run No. | $Fe(NO_3)_3$ present | pH | Mole Weight of Polystyrene |
|---|---|---|---|
| 1 | No | 2.0 | 166,000 |
| 2 | No | 2.5 | 172,000 |
| 3 | No | 3.0 | 194,000 |
| 4 | Yes | 1.7 | 74,000 |
| 5 | Yes | 1.8 | 68,000 |
| 6 | Yes | 2.0 | 63,000 |
| 7 | Yes | 2.2 | 62,000 |
| 8 | Yes | 2.4 | 68,000 |
| 9 | Yes | 2.8 | 140,000 |
| 10 | Yes | 3.0 | 180,000 |

Example 4

This example illustrates the effect of varying the proportion of an iron salt present during the polymerization of styrene in acidic aqueous emulsions which contain hydrogen peroxide. Three series of experiments were carried out. The procedure was similar to that described in Example 1, except that all of the polymerization reactions were carried out at 90° C. using emulsions having a pH value of 2. The aqueous styrene emulsions employed in the first series of experiments contained hydrogen peroxide in amount corresponding to 0.24 per cent of the weight of the styrene; those employed in the second series contained 0.45 per cent of hydrogen peroxide, on the same basis; and those employed in the third series of experiments contained 0.6 per cent of hydrogen peroxide, based on the weight of the styrene. After completing each polymerization, the polystyrene product was separated and its average molecular weight was determined. The data thus collected was used in plotting the curves shown in Fig. 5 of the drawing. Table IV gives the proportion of hydrogen peroxide employed in each experiment as per cent of the weight of the styrene and the proportion of ferric nitrate as parts by weight of iron per million parts of styrene. It also gives the molecular weight of the polystyrene obtained in each experiment.

Table IV

| Run No. | $H_2O_2$, Per Cent | Fe, P. P. M. | Mole Weight of Polystyrene |
|---|---|---|---|
| 1 | 0.24 | 0.07 | 179,000 |
| 2 | 0.24 | 0.23 | 140,000 |
| 3 | 0.24 | 0.92 | 80,000 |
| 4 | 0.24 | 2.31 | 57,000 |
| 5 | 0.24 | 6.93 | 48,000 |
| 6 | 0.24 | 23.10 | 129,000 |
| 7 | 0.45 | 0.07 | 148,000 |
| 8 | 0.45 | 0.23 | 101,000 |
| 9 | 0.45 | 0.92 | 62,000 |
| 10 | 0.45 | 2.31 | 40,000 |
| 11 | 0.45 | 6.93 | 30,000 |
| 12 | 0.45 | 23.10 | 40,000 |
| 13 | 0.6 | 0.07 | 125,000 |
| 14 | 0.6 | 2.31 | 39,000 |
| 15 | 0.6 | 6.93 | 29,000 |
| 16 | 0.6 | 23.10 | 42,000 |

Example 5

This example illustrates the combined effects, on the average molecular weight of polystyrene, of changes in the polymerization temperature and of changes in the proportion of an iron salt present during formation of the polystyrene by polymerizing styrene in acidic, aqueous, peroxide-containing emulsions. Three series of experiments were carried out using polymerization temperatures of 70° C., 90° C. and 100° C., respectively. The procedure was similar to that described in Example 1, except that each emulsion of styrene initially contained hydrogen peroxide in amount corresponding to 0.6 per cent of the weight of the styrene; each emulsion had a pH value of 2.5, and each emulsion contained the proportion of ferric nitrate indicated in the following table. The polystyrene obtained in each experiment was separated and its average molecular weight was determined. The data obtained was used in plotting the curves shown in Fig. 6 of the drawing. Table V gives the polymerization temperature employed in each experiment, the proportion of ferric nitrate in the emulsion as parts by weight or iron per million parts of styrene, and the molecular weight of the polystyrene product.

Table V

| Run No. | Temperature, °C. | Fe, P. P. M. | Mole Weight of Polystyrene |
|---|---|---|---|
| 1 | 70 | 0.07 | 292,000 |
| 2 | 70 | 0.23 | 226,000 |
| 3 | 70 | 0.92 | 129,000 |
| 4 | 70 | 2.31 | 78,000 |
| 5 | 70 | 6.93 | 52,000 |
| 6 | 70 | 23.10 | 38,000 |
| 7 | 90 | 0.07 | 170,000 |
| 8 | 90 | 0.23 | 109,000 |
| 9 | 90 | 0.92 | 54,000 |
| 10 | 90 | 2.31 | 46,000 |
| 11 | 90 | 6.93 | 43,000 |
| 12 | 90 | 23.10 | 51,000 |
| 13 | 100 | 0.07 | 138,000 |
| 14 | 100 | 0.23 | 106,000 |
| 15 | 100 | 0.92 | 52,000 |
| 16 | 100 | 2.31 | 32,000 |
| 17 | 100 | 6.93 | 32,000 |
| 18 | 100 | 23.10 | 42,000 |

Example 6

This example shows the results obtainable by polymerizing an aliphatic conjugated diolefine in an acidic aqueous emulsion containing, in addition to the diolefine and the emulsifying agent, a peroxide and an iron salt. A purpose of the example is to illustrate the changes in the properties of the polymer product which result from changes in the proportion of the iron salt. In each of a series of experiments, 2 cubic centimeters of concentrated nitric acid, 7.8 grams of hydrogen peroxide ($H_2O_2$), 10 grams of Nopco (a sodium salt of sulphonated sperm oil), and ferric nitrate in the proportion given in the following table were dissolved in 2.4 kilograms of water. The resultant solution was placed in an autoclave and 200 grams of liquefied butadiene was added. The autoclave was closed and the mixture was agitated to effect emulsification. The pH value of the emulsion was approximately 2.2. The mixture was heated with agitation at 90° C. until the decrease in vapor pressure of the reaction mixture indicated that approximately 80–95 per cent of the butadiene had been polymerized. The autoclave was then cooled, opened and 2 grams of 4.4'-dimethoxy-diphenylamine was added to stabilize the polymer against oxidation by air. The polymer was then coagulated as usual by adding sodium chloride and heating. The product was removed and dried under vacuum. The product was then examined to determine whether it was tacky at room temperature and whether it was readily soluble in cyclohexanone. Only the polymers of unusually low molecular weight are both tacky and soluble in said solvent. The following table gives the proportion of hydrogen peroxide employed in each experiment as per cent of the weight of the butadiene and the proportion of ferric nitrate in the emulsion as parts by weight of iron per million parts of butadiene. It also states whether the polymer product is tacky at room temperature and whether it is soluble in cyclohexanone.

Table VI

| Run No. | $H_2O_2$, Per cent | Fe, P. P. M. | Polymer Tacky | Polymer Soluble |
|---|---|---|---|---|
| 1 | 3.9 | 0 | Slightly | No. |
| 2 | 3.9 | 6.9 | Yes | No. |
| 3 | 3.9 | 34.4 | Yes | No. |
| 4 | 3.9 | 68.8 | Yes | Yes. |
| 5 | 3.9 | 110.0 | Yes | Yes. |
| 6 | 3.9 | 137.5 | Yes | No. |
| 7 | 3.9 | 206.0 | No | No. |

It will be noted that the presence of an iron salt is necessary in order to obtain the soluble and tacky polymer product, but that, when using the above proportion of peroxide, the employment of more than about 120 parts per million of iron (as a soluble iron salt) prevents formation of a soluble polymer. However, by increasing the proportion of peroxide in the emulsion, the soluble tacky polymer may be obtained even when using more than 120 parts per million of iron. It should be mentioned that when a soluble tacky product is desired the polymerization should be stopped slightly short of completion, e. g. when from 80 to 95 per cent of the butadiene is polymerized, since the final 5 per cent or so of the diolefine, if polymerized, causes the product to become insoluble and non-tacky. It may also be mentioned that the appearance and other properties of the products vary in accordance with the tackiness and solubility characteristics listed above. The products which are non-tacky or only slightly tacky are somewhat rubbery and are readily crumbled or pulled apart by the fingers without becoming greatly elongated. The tacky products undergo considerable elongation before breaking when pulled or stretched. The products which are soluble in cyclohexanone are more tacky than those which are insoluble.

EXAMPLE 7

In each of a series of experiments similar to those described in Example 6, 86 grams of styrene and 200 grams of butadiene were added to 2.4 kilograms of an aqueous solution containing 2 cubic centimeters of concentrated nitric acid, 7.8 grams of hydrogen peroxide ($H_2O_2$), 30 grams of Nopco, and the proportion of ferric nitrate indicated in the following table. The mixture was agitated to effect emulsification and was heated in a closed container with continued agitation at a polymerization temperature of 90° C. The reaction was stopped when from 80 to 95 per cent of the mixture of styrene and butadiene had been polymerized. The time of heating at the reaction temperature varied in the different experiments from 55 to 155 minutes. Each polymer product was separated, dried and examined for tackiness at room temperature and for solubility in cyclohexanone, as in Example 6. The following table gives the proportion of hydrogen peroxide as per cent of the combined weight of the styrene and butadiene, the proportion of ferric nitrate as parts by weight of iron per million parts of the polymerizable compounds and states whether the co-polymer product was tacky at room temperature and whether it was soluble.

Table VII

| Run No. | $H_2O_2$, Percent | Fe, P. P. M. | Product | |
|---|---|---|---|---|
| | | | Tacky | Soluble |
| 1 | 2.7 | None | No | No. |
| 2 | 2.7 | 4.8 | No | No. |
| 3 | 2.7 | 24.1 | Yes | No. |
| 4 | 2.7 | 48.3 | Yes | Yes. |
| 5 | 2.7 | 96.6 | No | No. |

As in Example 6, the products which are tacky may be stretched considerably before breaking, whereas those which are non-tacky are readily pulled apart or crumbled without being as greatly elongated. The soluble product is the most tacky of those listed in Table VII.

EXAMPLE 8

In each of a series of experiments, a co-polymer of butadiene, styrene, and methyl isopropenyl ketone were prepared. The procedure in carrying out the experiments was similar to that described in Example 6. In each experiment an aqueous emulsion was prepared containing 120 grams of butadiene-1,3, 120 grams of methyl isopropenyl ketone, 60 grams of styrene, 2.5 kilograms of water, 30 grams of Nopco, 2.61 grams of hydrogen peroxide ($H_2O_2$), 2 cubic centimeters of concentrated nitric acid and the proportion of ferric nitrate indicated, as parts of iron per million parts of the polymerizable compounds, in the following table. Each emulsion was heated at 90° C. under pressure and with agitation in a closed container until the polymerization reaction was from 80 to 95 per cent complete. The reaction periods varied from 18 to 30 minutes. The co-polymer product was separated and tested for tackiness at room temperature and solubility in cyclohexanone.

Table VIII

| Run No. | Fe, P. P. M. | Product | |
|---|---|---|---|
| | | Tacky | Soluble |
| 1 | 0 | No | No. |
| 2 | 4.6 | No | No. |
| 3 | 23.0 | No | No. |
| 4 | 46.0 | Yes | Yes. |
| 5 | 92.0 | Yes | Yes. |

The tacky products, when stretched, were elongated to a far greater extent before breaking than the non-tacky products.

EXAMPLE 9

Two comparative experiments on the preparation of the co-polymer of butadiene-1,3, styrene, and methyl isopropenyl ketone were carried out for purpose of determining the effect on the properties of the product of changes in the proportion of hydrogen peroxide in the polymerization mixture. The aqueous emulsion employed in each experiment contained 2.5 kilograms of water, 120 grams of butadiene, 120 grams of methyl isopropenyl ketone, 60 grams of styrene, 30 grams of Nopco, 2 cubic centimeters of concentrated nitric acid, ferric nitrate in amount containing 46 parts by weight of iron per million parts of the polymerizable compounds, and hydrogen peroxide in the proportion indicated in the following table. Each emulsion was heated with agitation in a closed container at 90° C. for approximately 26 minutes, after which the co-polymer product was separated and its properties were determined as in Example 8. Table IX gives the proportion of hydrogen peroxide employed in each experiment as per cent of the combined weight of the polymerizable compounds, and states whether the product was tacky at room temperature or soluble in cyclohexanone.

Table IX

| Run No. | $H_2O_2$, Per Cent | Product | |
|---|---|---|---|
| | | Tacky | Soluble |
| 1 | 0.5 | No | No. |
| 2 | 1.0 | Yes | Yes. |

In Table IX the failure to obtain a tacky and soluble product in Run 1 was apparently due to the peroxide becoming largely decomposed before completion of the polymerization reaction so that during the final stages of the reaction the function of the ferric nitrate in suppressing the molecular weight of the polymer being formed was not obtained. As hereinbefore mentioned, iron salts are highly effective in suppressing the molecular weight of the polymers only when a peroxide also is present. Run 2 of the table shows that by increasing the proportion of peroxide, while using the same proportion of ferric nitrate, a tacky, soluble copolymer was obtained. As in Examples 6–8, the tacky product can be stretched to a far greater extent before breaking than may the non-tacky product. The latter may readily be pulled apart or crumbled by the fingers.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein a polymerizable organic material selected from the class consisting of monovinyl aromatic compounds having the vinyl group attached to a carbon atom of the aromatic nucleus and aliphatic conjugated diolefines is polymerized while in aqueous emulsion, the improvements which consist in carrying out the polymerization at temperatures between 50° and 150° C. in an emulsion having a pH value between 1.5 and 3 and initially containing a water-soluble peroxide in amount sufficient to cause the polymerization to occur and continue throughout the reaction period at a rate greater than when the peroxide is omitted and also containing an iron salt of an inorganic acid, which iron salt is compatible with the emulsion and is ionizable to form positive iron ions, said iron salt being present in a proportion containing between 0.01 and 500 parts by weight of iron per million parts of the polymerizable organic material and such as to produce a polymer of desired molecular weight.

2. The method as described in claim 1 wherein a peroxide is present throughout the reaction period.

3. The method as described in claim 1 wherein a peroxide is present throughout the reaction period and the polymerization reaction is carried out at temperatures between 50° and 125° C.

4. The method as described in claim 1 wherein the peroxide is employed in a proportion such as to be largely decomposed during and before completion of the polymerization reaction, whereby a polymeric product comprising polymers of widely different molecular weights is formed.

5. The method as described in claim 1 wherein the iron salt is employed in a proportion such as to contain between 1 and 100 parts of iron per million parts of the polymerizable compound, the peroxide is employed in a proportion such that it is substantially decomposed during and before completion of the polymerization reaction, and the emulsion is of a pH value between 1.7 and 3, whereby a polymeric product comprising polymers of widely different molecular weights is formed.

6. In a method wherein a monovinyl aromatic compound having the vinyl group attached to a carbon atom of the aromatic nucleus is polymerized while in aqueous emulsion, the improvements which consist in carrying out the polymerization at temperatures between 50° and 150° C. in an aqueous emulsion having a pH value between 1.5 and 3 and initially containing a water-soluble peroxide in amount sufficient to cause the polymerization to occur and continue throughout the reaction period at a rate greater than when the peroxide is omitted and also containing an iron salt of an inorganic acid, which iron salt is compatible with the emulsion and is ionizable to form positive iron ions, said iron salt being present in a proportion containing between 0.01 and 500 parts by weight of iron per million parts of the polymerizable organic material and such as to produce a polymer of desired molecular weight.

7. The method as described in claim 6 wherein a peroxide is present throughout the reaction period.

8. The method as described in claim 6 wherein a peroxide is present throughout the reaction period, the iron salt is employed in a proportion such as to contain between 1 and 100 parts of iron per million parts of the vinyl aromatic compound and the polymerization is carried out at temperatures between 50° and 125° C.

9. The method as described in claim 6 wherein the monovinyl aromatic compound is styrene, a peroxide is present throughout the polymerization reaction, the iron salt is employed in a proportion such as to contain between 1 and 100 parts of iron per million parts of the styrene, and the polymerization is carried out at temperatures between about 70° and about 100° C.

10. The method as described in claim 6 wherein the peroxide is employed in a proportion such as to be substantially decomposed during and before completion of the polymerization reaction, whereby a polymer product comprising polymers of widely different molecular weights is formed.

11. The method as described in claim 6, wherein the iron salt is employed in a proportion such as to contain between 10 and 100 parts of iron per million parts of the vinyl aromatic compound, the peroxide is employed in a proportion such as to be substantially decomposed during the before completion of the polymerization reaction, and the polymerization is carried out at temperatures between 50° and 125° C., whereby a polymer product comprising polymers of widely different molecular weights is formed.

12. The method as described in claim 6 wherein the vinyl aromatic compound is styrene, the peroxide is hydrogen peroxide, the iron salt is a water-soluble salt of an inorganic acid, the emulsion has a pH value between about 2 and about 2.8, the iron salt is present in amount corresponding to between 10 and 100 parts of iron per million parts of styrene, the peroxide is present in a proportion such as to be substantially decomposed during and before completion of the polymerization reaction, which proportion of hydrogen peroxide is such as to correspond to between 0.1 and 1 per cent of the weight of the styrene, and the polymerization is carried out at temperatures between about 70° and about 100° C., whereby polystyrene comprising polymer molecules of widely different molecular weights is formed.

13. In a method wherein a polymerizable organic material comprising an aliphatic conjugated diolefine is polymerized while in aqueous emulsion, the improvements which consist in carrying out the polymerization at temperatures between 50° and 150° C. in an aqueous emulsion having a pH value between 1.5 and 3 and initially containing a water-soluble peroxide in amount sufficient to cause the polymerization to occur and continue throughout the reaction period at a rate greater than when the peroxide is omitted and also containing an iron salt of an inorganic acid, which iron salt is compatible with the emulsion and is ionizable to form positive iron ions, said iron salt being present in a proportion containing between 0.01 and 500 parts by weight of iron per million parts of the polymerizable organic material and such as to produce a polymer of desired molecular weight.

14. The method as described in claim 13 wherein a mixture of polymerizable organic compounds comprising an aliphatic conjugated diolefine and a monovinyl aromatic compound is polymerized.

15. The method as described in claim 13, wherein a peroxide is present throughout the reaction period and the polymerization reaction is carried out at a temperature between 50° and 125° C..

16. The method as described in claim 13 wherein a mixture of polymerizable organic compounds comprising butadiene-1.3 and styrene is polymerized, a peroxide is present throughout the reaction period, the iron salt is employed in a proportion such as to contain between 1 and 200 parts of iron per million parts of the polymerizable compounds and the polymerization is carried out at temperatures between 50° and 125° C.

17. The method as described in claim 13 wherein a mixture of polymerizable organic compounds comprising butadiene-1.3 and styrene is polymerized, the peroxide is employed in a proportion such that it is substantially decomposed during and before completion of the polymerization reaction, the iron salt is employed in a proportion such as to contain between 1 and 200 parts of iron per million parts of the polymerizable compounds, and the polymerization is carried out at temperatures between 50° and 100° C.

18. A method of making a tacky polymeric product which comprises polymerizing a polymerizable organic material comprising, an aliphatic conjugated diolefine at a temperature between about 50° and about 100° C. while in an acidic aqueous emulsion of pH value between 2 and 2.8, which emulsion contains a water-soluble peroxide during the major part of the polymerization reaction and contains an iron salt of an inorganic acid in amount such as to contain between 1 and 500 parts of iron per million parts of the polymerizable organic material.

19. The method as described in claim 18 wherein the material subjected to the polymerization is a mixture of butadiene-1.3 and styrene.

20. The method as described in claim 18 wherein the material subjected to the polymerization is a mixture of butadiene-1.3, styrene and methyl isopropenyl ketone.

EDGAR C. BRITTON.
WALTER J. LE FEVRE.

REFERENCES CITED

The following references are of record in the file of this patent:

UNITED STATES PATENTS

| Number | Name | Date |
| --- | --- | --- |
| 2,234,076 | Gumlich et al. | Mar. 4, 1941 |
| 2,380,474 | Stewart | July 31, 1945 |

OTHER REFERENCES

Lange, Handbook of Chemistry, pages 530–533, published 1934, by Handbook Publishers, Inc., Sandusky, Ohio.

Karrer, "Organic Chemistry," page 391, published by "Elsevier" N. Y. 1938.